United States Patent
Conboy et al.

(10) Patent No.: US 10,003,666 B2
(45) Date of Patent: *Jun. 19, 2018

(54) KEY RESOURCE PREFETCHING USING FRONT-END OPTIMIZATION (FEO) CONFIGURATION

(71) Applicant: Akamai Technologies, Inc., Cambridge, MA (US)

(72) Inventors: Craig Conboy, Kanata (CA); Guy Podjarny, Ottawa (CA); Christopher P. Daley, Ottawa (CA)

(73) Assignee: Akamai Technologies, Inc., Cambridge, MA (US)

( * ) Notice: Subject to any disclaimer, the term of this patent is extended or adjusted under 35 U.S.C. 154(b) by 85 days.

This patent is subject to a terminal disclaimer.

(21) Appl. No.: 15/331,831

(22) Filed: Oct. 22, 2016

(65) Prior Publication Data
US 2017/0041424 A1  Feb. 9, 2017

Related U.S. Application Data

(63) Continuation of application No. 14/494,682, filed on Sep. 24, 2014, now Pat. No. 9,477,774.

(60) Provisional application No. 61/882,202, filed on Sep. 25, 2013.

(51) Int. Cl.
G06F 17/00 (2006.01)
H04L 29/08 (2006.01)
G06F 12/0862 (2016.01)
G06F 17/30 (2006.01)

(52) U.S. Cl.
CPC ...... *H04L 67/2847* (2013.01); *G06F 12/0862* (2013.01); *G06F 17/30902* (2013.01); *H04L 67/02* (2013.01); *H04L 67/1097* (2013.01)

(58) Field of Classification Search
None
See application file for complete search history.

*Primary Examiner* — Mohammed-Ibrahim Zuberi
(74) *Attorney, Agent, or Firm* — David H. Judson

(57) ABSTRACT

Front-end optimization (FEO) configuration information is leveraged to identify "key" resources required to load other pages on a site, and to automatically cause key resources to be prefetched to a server, and to the browser. In this approach, an FEO analyzer uses knowledge of configured optimization templates to determine the key resources required to load pages for each template. The key resources for pages belonging to other optimization templates are then selectively prefetched by other pages. In a preferred approach, the FEO analyzer provides an edge server cache process a list of key resources and instructions to prefetch the key resources, as well as instructions to rewrite the HTML of the page to include instructions for the browser to prefetech the key resources. On the client, key resources are prefetched if missing from a cache on the browser. Key resources preferably are stored in the browser's HTML5 local storage cache.

6 Claims, 3 Drawing Sheets

KEY RESOURCE PREFETCHING USING FRONT-END OPTIMIZATION (FEO) CONFIGURATION

BACKGROUND

Technical Field

This application relates generally to overlay networking and, in particular, to front-end optimization (FEO) techniques that are used in association with an overlay network (e.g., a content delivery network (CDN)) to accelerate web pages.

Brief Description of the Related Art

Distributed computer systems are well-known in the prior art. One such distributed computer system is a "content delivery network" or "CDN" that is operated and managed by a service provider. The service provider typically provides the content delivery service on behalf of third parties (customers) who use the service provider's infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

An overlay network such as described above may incorporate or interoperate with a Front-End Optimization (FEO) scheme. FEO is the process of accelerating web pages by modifying the HTML and resources on them. The goal is to eliminate bottlenecks and inefficiencies in the front-end of a site that is using the overlay. In FEO, there are numerous specific optimizations that may be employed, and they aim to do one or more of the following: reduce the number of HTTP requests required to load the page, downloading more data in one request instead; reduce the total size of the web page and its parts by using more efficient formats, improving cache-ability and removing unnecessary content; and accelerating rendering by making the browser load resources in a different order or timing, e.g., preventing the ability of a third party script from delaying everything else on the page.

BRIEF SUMMARY

According to this disclosure, front-end optimization (FEO) configuration information is leveraged to automatically identify important (sometimes referred to as "key") resources required to load other pages on a site, and to automatically cause key resources to be prefetched (a) to the CDN edge and (b) to the browser.

An FEO configuration typically defines one or more templates (sometimes referred to as "optimization templates" or "policies") to classify together the major types of pages on a site. For instance, an e-commerce site might have the following optimization templates: home page, product category page, product detail page, and so forth. According to the techniques described herein, an FEO analyzer uses this knowledge of configured optimization templates (policies) to determine the key resources required to load pages for each template. The key resources for pages belonging to other optimization templates are then selectively prefetched by other pages. In the above example, the home page can prefetch the key resources required to load a product category page, as well as the key resources required to load a product detail page. This makes the subsequent page load much faster as the user moves off the home page and onto a product category page. In a preferred approach, the FEO analyzer provides an edge server cache process a list of key resources and instructions to prefetch the key resources, as well as instructions to rewrite the HTML of the page to include instructions for the browser to prefetch the key resources.

On the client side, preferably key resources are only prefetched if missing from a cache on the browser. Key resources preferably are stored in the browser's client-side storage, such as HTML5 local storage. This allows an FEO script to determine if the resource is already present in the browser's storage. If the key resource is present, it is not fetched from the edge network. If the key resource is missing, however, the key resource is prefetched after the current page is rendered.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
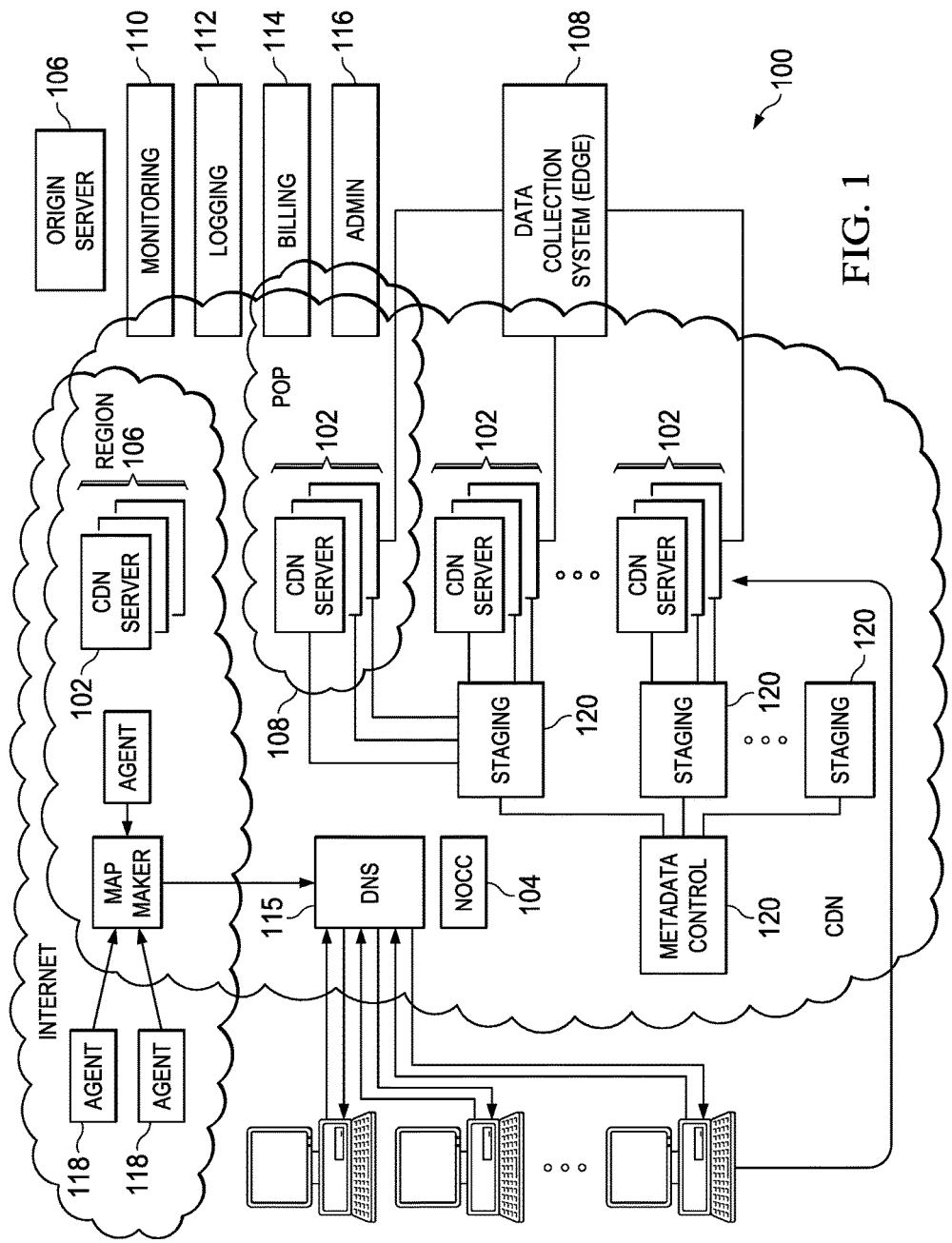
FIG. 1 is a block diagram illustrating a known distributed computer system configured as a content delivery network (CDN)

In a known overlay network system, such as shown in FIG. 1, a distributed computer system 100 is configured as a CDN and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as website 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or subdomains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
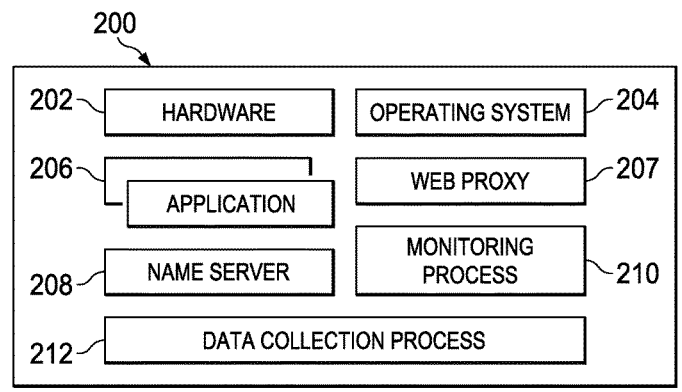
FIG. 2 is a representative CDN edge machine configuration.

As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" process), a name server 208, a local monitoring process 210, a distributed data collection process 212, and the like. More generally, ghost is software, comprising program instructions, which instructions are held in memory and executed by a processor as needed. For streaming media (that is not HTTP-based), the machine may include one or more media servers, such as a Windows Media Server (WMS) or Flash server, as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

Because the CDN infrastructure is shared by multiple third parties, it is sometimes referred to herein as a multi-tenant shared infrastructure. The CDN processes may be located at nodes that are publicly-routable on the Internet, within or adjacent nodes that are located in mobile networks, in or adjacent enterprise-based private networks, or in any combination thereof.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

The techniques described in U.S. Pat. Nos. 6,820,133 and 7,660,296 may be used to facilitate packet delivery between edge and forward proxies in an overlay network.

An overlay network such as described above may incorporate or interoperate with a Front-End Optimization (FEO) scheme. FEO is the process of accelerating web pages by modifying the HTML and resources on them. The goal is to eliminate bottlenecks and inefficiencies in the front-end of a site that is using the overlay. In FEO, there are numerous specific optimizations that may be employed, and they aim to do one or more of the following: reduce the number of HTTP requests required to load the page, downloading more data in one request instead; reduce the total size of the web page and its parts by using more efficient formats, improving cache-ability and removing unnecessary content; and accelerating rendering by making the browser load resources in a different order or timing, e.g., preventing the ability of a third party script from delaying everything else on the page.

Figure 3:
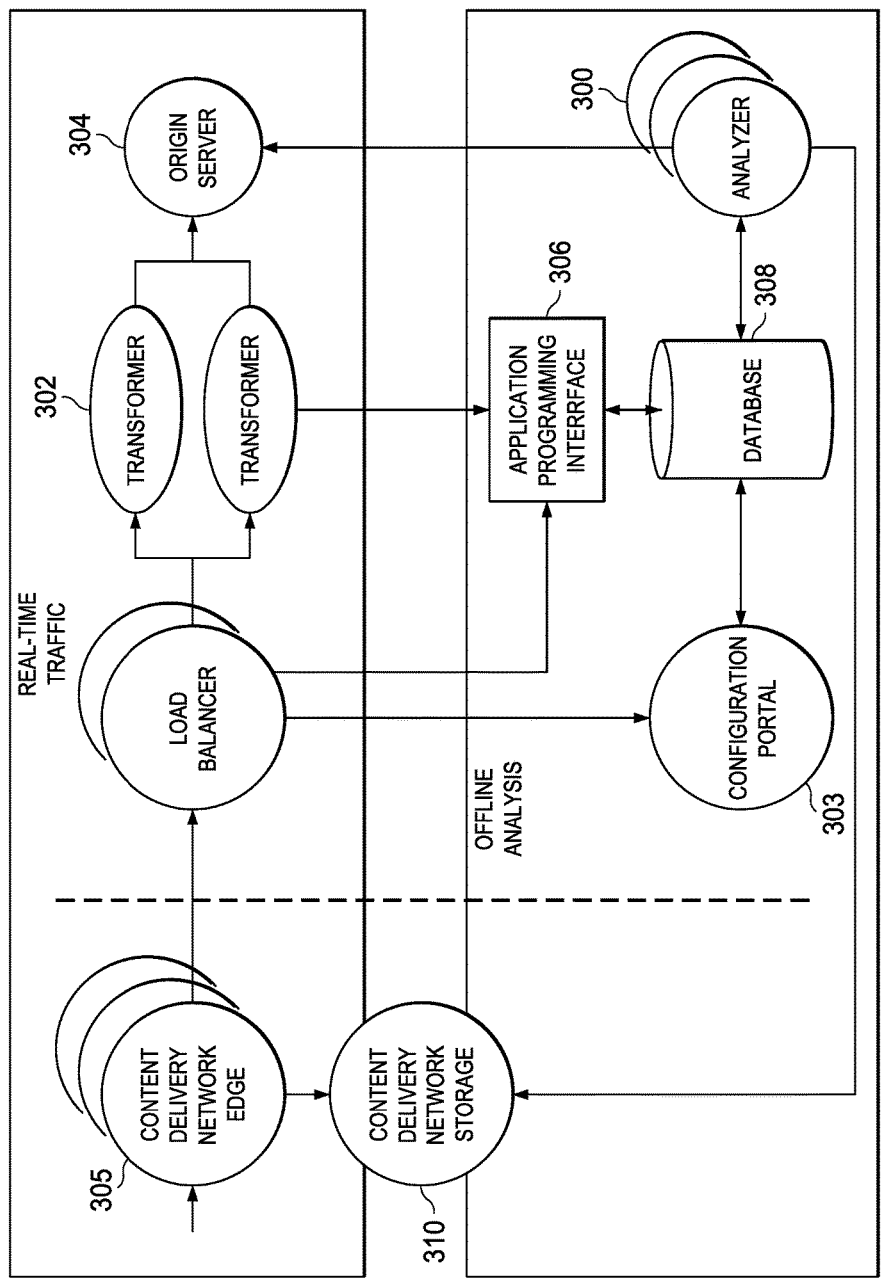
FIG. 3 is a representative FEO mechanism integrated into an overlay network, such as a CDN.

FIG. 3 illustrates an FEO mechanism integrated into an overlay, such as a CDN. The FEO mechanism includes a set of elements and components. An analyzer 300 is the system that analyzes pages from a CDN customer website and decides which optimizations should be applied to which types of pages. The output of the analyzer is a set of transformations that should be applied to a template and a set of optimized resources. Preferably, the process of analyzing pages is request driven, as opposed to having the analyzer crawl a customer's website. Thus, the analyzer determines what optimizations should be applied to the page requested by the end user. This analysis process is done asynchronously from request servicing. A transformer 302 is a process that rewrites the contents of a page based on the instructions provided by the analyzer 300. The transformer 302 transforms the page while serving the request. To reduce the workload on the analyzer, preferably pages are grouped into templates. Preferably, a page belongs to only one template. The mapping of pages to templates is referred to as normalization, and preferably normalization is based on the URL requested and the browser that issues the request. An FEO optimization refers to a technique used by FEO to improve the performance of a page; they include, without limitation, just-in-time image loading, minification, domain sharding, and others. In this approach, a transformation describes what modifications will be applied to the page content. As noted above, the transformations are computed by the analyzer 300 and given to the transformer 302, which applies the transformation to the page. Optimized resources are the elements of a web page that have been optimized by the analyzer; they include, without limitation, compressed images, combined CSS or JavaScript. Optimized resources are stored in a reliable storage and are referenced by the transformed page and are available to a requesting client browser after the page is optimized. Base resources are the resources from a web page that are optimized by FEO, e.g., images that are compressed by the analyzer are base resources.

The request-driven processing of this system is now described. An overlay network customer is provisioned to use the FEO service using the customer portal 303. CDN edge servers 305 are provided configuration data indicating that FEO should be applied to the customer's site (or some portions thereof). A first user request is then received at an edge server. The edge server GHost (global host) process applies its configuration data and determines that this request should use FEO. It then looks up the normalization information for this digital property in its cache of FEO configurations. Since this is the first request, no such normalization information is present, so the process gets the page from the origin server 304 and serves it in the normal manner (without FEO). The host process then sends an asynchronous request to the FEO network asking for the normalization for this customer. In one embodiment, the global host process communicates with the FEO network using RESTful requests and data is exchanged an API 306 (such as Google protocol buffer). The API 306 responds to the request for normalization by doing a database 308 lookup for this digital property and returns the information. The responses to the RESTful requests are cached.

A second user request is then received at the edge server global host process, which then applies configuration and determines that this request should use FEO. The global host process then looks up the normalization information for this customer, and this information is now present. The process applies the normalization and computes the template to which this page is mapped. The process looks up the transformation instructions for this template but does not have them (given this initial process flow). Thus, the global host process serves the page, once again without the FEO optimizations. It also sends an asynchronous request to the FEO network asking for the transformations for this template. If the transformations for this template have not yet been computed the API enqueues the request for analysis in the database 308 and provides the requesting process a HTTP 404 negative response that is cached with a short TTL. The analyzer then dequeues the request information, makes the request for the page from the origin server, receives it, and then analyzes it based on the optimizations configured during customer provisioning. The analyzer produces a list of the transformations for this template and stores it in the database. The next time any global host process asks for the transformations for this request, the FEO API replies with the transformation bundle. The analyzer also produces a set of optimized resources and stores these resources in storage 310. If the transformations for this template have already been computed in a previous analysis the API retrieves this information from the database and responds to the requesting global host process with a transformation bundle. Preferably, the transformation bundles are stored in the global host process LRU cache.

A third user request is then received at the edge server global host process. As before, the process applies configuration data and determines that this request should use FEO. The process looks up the normalization information for this customer. It has that information and applies it to compute the template to which this page is mapped. The global host process also now has the list of transformations for this template by virtue of the prior processing. The process requests the page from origin and applies these transformations to the page. Preferably, the process applies the transformations in a streaming fashion, which reduces the memory usage and improves responsiveness. Once the transformations have been applied the global host process serves the FEO-modified page to the end user. The browser gets the modified page and accesses storage to retrieve the optimized resources. Preferably, the optimized resources are cached in the overlay CDN.

Further details of the above-described technique are described in U.S. Pat. No. 8,788,577, the disclosure of which is incorporated herein.

The references herein to "FEO" and "FEO configuration" are not intended to be limited to any particular technology or commercial implementation. Generalizing, front-end optimization refers to any tool that modifies HTML (or its equivalent) and/or the resources it directly or indirectly references for the purpose of accelerating the time to complete the page load (or milestones within the page load. Likewise, the references herein to an FEO template should not be construed as limiting; generalizing, a template refers to a structure for a page or a part of a page (comprising web elements such as HTML, JavaScript, CSS and images) that is reused with different user content. For example, a corporate website home page that is updated with new product promotions, an article page that is reused for different news articles, a product page that is reused for different product descriptions and prices, and the like.

Also, the references herein to a website or web pages should be broadly construed. A website may comprise a traditional website (comprising a set of web pages), or a web application. A web page also may include or reference AJAX technologies. An AJAX web page is one that changes, for example, given instructions in a URL. AJAX technologies include XHTML (Extensible HTML) and CSS (Cascading Style Sheets) for marking up and styling information, the use of DOM (Document Object Model) accessed with client-side scripting languages, the use of an XMLHttpRequest object (an API used by a scripting language) to transfer XML and other text data asynchronously to and from a server using HTTP), and use of XML or JSON (Javascript Object Notation, a lightweight data interchange format) as a format to transfer data between the server and the client.

Thus, a page is a structure that, given a URL, delivers all the necessary components (e.g., HTML, CSS, JavaScript, images, etc.) to render and interact with it. In the context of AJAX, the notion of a page also may include the case of having a previous page loaded and, as triggered by the entry of a new URL or JavaScript action, modifies the displayed content or available actions, thereby creating a new state of the previous page.

With respect to delivery of content via AJAX, optimizing the page using Front-End Optimization (FEO) typically includes at least changing the HTML to point to other resources or to load resources in a different manner, and injecting JavaScript to the page that, upon execution, will fetch some of the resources on the page (or portions of them, or new resources) using JavaScript-triggered actions, such as XMLHttpRequest (XHR) calls, Document Object Model (DOM) Manipulation, and the like.

Key Resource Prefetching Using FEO Configuration

With the above as background, the technique of this disclosure is now described. The technique assumes that a browser supports a client-side storage mechanism, such as HTML5 Local Storage. The references herein to HTML5 Local Storage and its use are not intended to be limiting.

By way of brief background, HTML5 Local Storage is also known as the W3C Web Storage standard. The Web Storage specification provides a way for web pages to store named key/value pairs locally, namely, within the client browser (typically within a cache). Depending on how it is stored, the data may persist after the user navigates away from the website, closes the browser tab from which the page was reached, or closes the browser altogether. The data in such local storage, however, is not transmitted automatically when the browser makes a request to the server (as is the case with cookies). The data is stored in named key/value pairs (which are stored as strings), and a web page can only access data that is stored by itself or by other web pages from the same website. The data is stored in two types of objects: localStorage, and sessionStorage. The localStorage object stores the data with no expiration date, and thus the data is maintained even when the browser is closed. The sessionStorage object stores the data for just one session, and the data is deleted when the user closes the browser window. Browsers that support HTML5 Local Storage include, Internet Explorer 8+, Firefox, Chrome, Safari, and Opera.

According to this disclosure, the FEO configuration information is leveraged to automatically identify important (sometimes referred to as "key") resources required to load other pages on a site, and to automatically cause key resources to be prefetched (a) to the CDN edge and (b) to the browser. An FEO configuration typically defines one or more templates (sometimes referred to as "optimization templates" or "policies") to classify together the major types of pages on a site. For instance, an e-commerce site might have the following optimization templates: home page, product category page, product detail page, and so forth. According to this disclosure, the FEO analyzer uses this knowledge of configured optimization templates (policies) to determine the key resources required to load pages for each template. The key resources for pages belonging to other optimization templates are then selectively prefetched by other pages. In the above example, the home page can prefetch the key resources required to load a product category page and the key resources required to load a product detail page. This makes the subsequent page load much faster as the user moves off the home page and onto a product category page. In a preferred approach, the FEO analyzer provides the edge server global host process a list of key resources and instructions to prefetch the key resources, as well as instructions to rewrite the HTML of the page to include instructions for the browser to prefetch the key resources.

Figure 4:
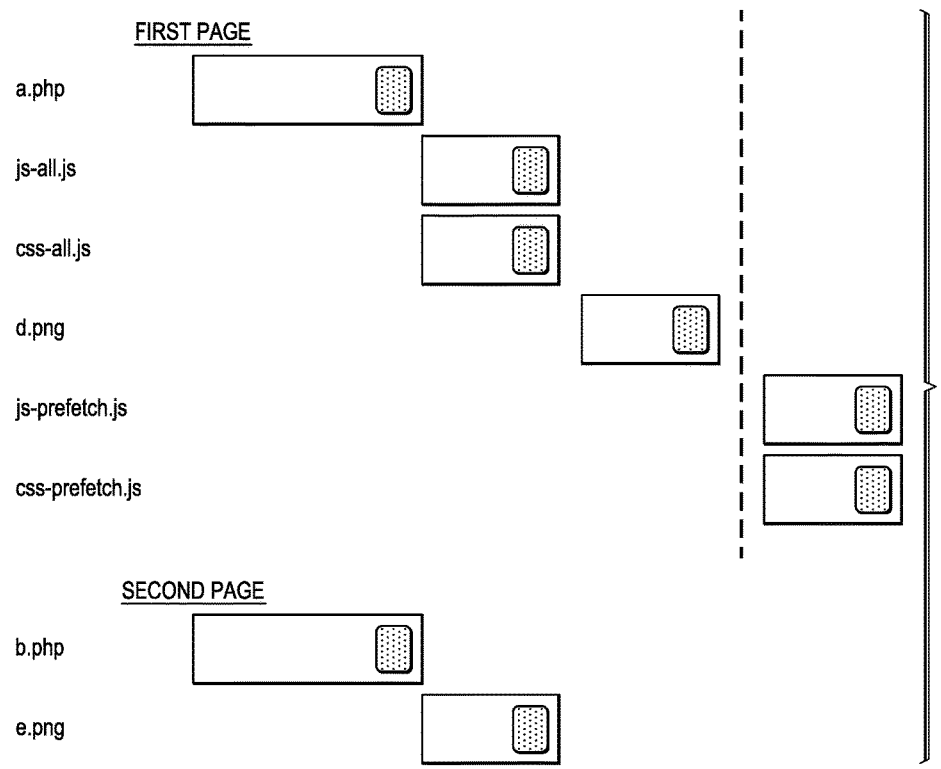
FIG. 4 illustrates an example HTML page that is rewritten to include instructions for the browser to prefetch key resources according to this disclosure.

FIG. 4 illustrates an example HTML page rewritten in this manner. In this example, the "first page" includes a set of resources (a.php, js-all.js, css-all.js, d.png) that have been processed by the FEO mechanism (in a known manner). Thus, for example, the file js-all.js represents all of the JavaScripts that are required for the first page. According to this disclosure, and based on the analysis of the FEO configuration, a pair of additional resources (js.prefetch.is and css-prefetch.js) have been identified as being "key resources" with respect to the "second page," which is a page that is linked to the first page. During the HTML rewrite of the first page, these key resources (required by the linked, second page) are then caused to be associated with the first page through the inclusion of one or more markup language instructions (e.g., JavaScript within a SCRIPT markup tag) that, when executed at the browser, cause these key resources to be prefetched to the client HTML5 Local Storage after onload of the first page. Then, when the end user navigates from the first page to the second page (the user's likely next page view in this example), these key resources are already present in the browser cache. Moreover, because the resources are prefetched into HTML5 Local Storage (preferably as localStorage objects), they may be retained in the cache for extended time periods, even when the user closes a browser tab, or closes the browser itself.

On the client side, key resources are only prefetched if missing from a cache on the browser. Key resources are stored in the browser's HTML5 local storage cache (or the like). This allows an FEO script to determine if the resource is already present in the browser's storage. If the key resource is present it is not fetched from the edge network. If it is missing, however, the key resource is prefetched after the current page is rendered.

Thus, the described approach prefetches into an end user client HTML5 local storage optimized resources (e.g. CSS and JavaScript) belonging to other templates. This warms that cache for subsequent page load from the site. In particular, as one of ordinary skill will appreciate, the approach provides a way to store site-wide CSS and JavaScript into browser HTML5 local storage upon the first page load of the site. In particular, after onload of the first page, the mechanism asynchronously loads CSS and JavaScript (or other optimized resources) that are used on other pages in the site and stores them in the browser local storage.

By leveraging the FEO configuration information in this manner, the technique provides a simple way to discover important resources to prefetch. The approach of pre-populating HTML local storage with resources used across policy templates improves page load performance on first-view access of subsequent pages, because the cacheable CSS and JavaScript resources are already present in the browser local cache.

Typically, the key resources that are prefetched are CSS and JavaScript resources, because these types of resources have the most impact on page load time.

The cache preloading technique thus reduces the total time it takes to browse between or among multiple pages on a site. This optimization provides the most value when the number of unique resources per template is high and, in particular, when first time visitors navigate from one page template to another. The approach is very beneficial when user session behavior on the site aligns well with the FEO template configuration.

As the skilled person will appreciate, the technique described herein provides an additional layer of intelligence built into the FEO analyzer to determine what resources should be prefetched and under what circumstances. The approach leverages the knowledge of the overall site (as embodied in the FEO configuration) to determine what resources to prefetch.

The following provides additional details of a representative implementation.

When a page is optimized, the resources that will be loaded into the cache preferably can be found in one of several different ways, e.g., a URL to analyze (URLToAnalyze) configuration item defined against the template, or by scanning links within the HTML page. A page that is analyzed with the cache preloading optimization enabled (as described herein) determines if there are URLs to analyze for each template provided by the configuration. If a template does not have a predefined URL, the analyzer attempts to find a link tag with a URL that matches the template's pattern. Preferably, a template is not processed if it is excluded by an entry in an exclusion list within a configuration. After all the templates have a URL that satisfies them, the analyzer collects a list of CSS and JavaScript resources that are available on the future pages. Future resources are filtered from processing if the resource exists on the current page, or is a CSS or JavaScript resource filtered by an exclusion. Each future resource that meets the criteria is then processed for local storage. Each script is processed according to the CSS or script analyzer settings for that template.

Preferably, the analyzer works by using representative pages for templates. If a representative page for a template exists, the analyzer uses it. While the page is being analyzed, preferably only links that match a template without a representative page are stored. After all the tags on the page have been processed, there will be a list of pages that need to be scanned. If a link on a page is malformed, it is ignored and excluded from being scanned. After the set of URLs have been collected, a resource collector function in the analyzer scans the pages. This collects into a set the style sheets and scripts on the future pages. Each script and CSS file is processed in the normal manner to apply content exclusions by content or URL, compression settings, regex replacements, and so forth. Scripts and CSS that are identified and processed have transformations created.

As can be seen, the approach is carried out as a particular template (of the initial page) is being analyzed; as the template is analyzed, the settings (URL patterns) associated with one or more linked pages are analyzed, associated resources therein are identified and optimized, with the results then pulled back into the initial template to facilitate the key resource prefetching upon loading of the initial page into HTML5 local storage. The approach herein prefetches the resources required for the user's likely next page view.

The approach may be varied to provide the ability to exclude scripts in a particular template from pre-population, but were those scripts are cached if the template is loaded. This option may be controlled by a configuration parameter on the template that would contain the resource.

The client is a conventional desktop, laptop or other Internet-accessible machine running a web browser or other rendering engine supporting HTML5 local storage (or the like). The client may also be a mobile device. As used herein, a mobile device is any wireless client device, e.g., a cellphone, pager, a personal digital assistant (PDA, e.g., with GPRS NIC), a mobile computer with a smartphone client, or the like. Other mobile devices in which the technique may be practiced include any access protocol-enabled device (e.g., iOS™-based device, an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

In a representative embodiment, the mobile device is a cellular telephone that operates over GPRS (General Packet Radio Service), which is a data technology for GSM networks. Generalizing, a mobile device as used herein is a 3G- (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

More generally, the server-side techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The server-side functionality may be provided as a service, e.g., as a SaaS solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system or the like.

The functionality may be implemented with any application layer protocol.

There is no limitation on the type of computing entity that may implement the client-side or server-side. Any computing entity (system, machine, device, program, process, utility, or the like) may act as the client or the server.

In addition to the advantages described above, the techniques herein generally provide for the above-described improvements to a technology or technical field (namely, overlay networking, content delivery, and the like), as well as the specific technological improvements to front-end optimization (FEO) technologies, all as described above.

As has been described, the approach herein improves deliverability of a website, especially page load performance on first-view access of subsequent pages of the site.

What is claimed is as follows:

1. A method to enhance deliverability of a website comprising a set of pages, comprising:
receiving a front-end optimization (FEO) configuration for the website, the FEO configuration identifying a set of page templates for the website, wherein a given page template is associated with a type of page;
analyzing the FEO configuration to identify, for a given page template associated with a first page, a set of one or more key resources of a page that is linked to the first page, the linked page being associated with at least one other page template in the set of page templates identified in the FEO configuration; and
rewriting markup language code for the page associated with the given page template to include one or more instructions to prefetch the one or more key resources upon load of the page.

2. The method as described in claim 1 wherein the instructions prefetch the one or more key resources into an HTML5 Local Storage associated with a requesting web client.

3. The method as described in claim 1 wherein the key resources are one of: a cascading style sheet (CSS), and a JavaScript.

4. The method as described in claim 1 further including excluding a given key resource from the one or more key resources when the given key resource is also present in the first page.

5. The method as described in claim 1 wherein analyzing the FEO configuration identifies one or more key resources required to load pages for each of the page templates in the set of page templates.

6. The method as described in claim 1 further including excluding one or more page templates from the set of page templates that are analyzed.

* * * * *